US008253972B2

(12) United States Patent  (10) Patent No.: US 8,253,972 B2
Suzuki  (45) Date of Patent: Aug. 28, 2012

(54) IMAGE PROCESSING SYSTEM, IMAGE PROCESSING APPARATUS, AUTHORIZED PERSON INFORMATION MANAGEMENT APPARATUS, IMAGE PROCESSING METHOD, AND COMPUTER READABLE MEDIUM

(75) Inventor: Yoshiharu Suzuki, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 767 days.

(21) Appl. No.: 12/372,909

(22) Filed: Feb. 18, 2009

(65) Prior Publication Data

US 2010/0039659 A1  Feb. 18, 2010

(30) Foreign Application Priority Data

Aug. 12, 2008  (JP) ................................. 2008-207849

(51) Int. Cl.
  *H04N 1/04*  (2006.01)
(52) U.S. Cl. ........... 358/1.4; 358/1.5; 358/474; 358/497
(58) Field of Classification Search .................. 358/1.4, 358/1.5, 474, 497, 498
  See application file for complete search history.

(56) References Cited

U.S. PATENT DOCUMENTS

| 2003/0103654 A1 | 6/2003 | Lapstun et al. |
| 2005/0010530 A1 | 1/2005 | Kakutani et al. |
| 2007/0115497 A1* | 5/2007 | Cowburn ..................... 358/1.14 |

FOREIGN PATENT DOCUMENTS

| JP | 10-143414 A | 5/1998 |
| JP | 2005-149406 A | 6/2005 |
| WO | 2007/046215 A1 | 4/2007 |

OTHER PUBLICATIONS

Extended European Search Report dated Nov. 18, 2009 in corresponding European Application No. 09163012.9.
Australian Office Action dated Apr. 13, 2010 in Australian Application No. 2009200757.

* cited by examiner

*Primary Examiner* — Houshang Safaipour
(74) *Attorney, Agent, or Firm* — Sughrue Mion, PLLC

(57) ABSTRACT

An image processing system includes an authorized person information management apparatus and an image processing apparatus, the authorized person information management apparatus including: a first reception unit; an authorized person information storage unit; an authorized person information acquisition unit; and a first transmission unit; the image processing apparatus including: a reading unit; a second transmission unit; a second reception unit; and an output unit.

9 Claims, 16 Drawing Sheets

FIG. 2

| AUTHENTICATION DATES AND TIMES | OPERATING USER IDS | AUTHENTICATION SUCCESS OF FAILURE |
|---|---|---|
| 2008/03/26 10:00:00 | User-00001 | SUCCESS |
| 2008/03/26 12:00:00 | User-00002 | SUCCESS |
| 2008/03/27 13:00:00 | User-00003 | SUCCESS |

| DOCUMENT IDS | DOCUMENT TITLES | GIVEN ACCESS RIGHT IDS |
|---|---|---|
| Document-00001 | DOCUMENT A | Acl-00001 |
| Document-00002 | DOCUMENT B | Acl-00002 |

| ACCESS RIGHT IDS | READING RIGHT USER IDS | WRITING RIGHT USER IDS | PRINTING RIGHT USER IDS | ACCESS RIGHT MODIFICATION USER IDS |
|---|---|---|---|---|
| Acl-00001 | User-00001<br>User-00002 | User-00001 | User-00002 | User-00001 |
| Acl-00002 | User-00001 | User-00001 | User-00001 | User-00001 |

| OPERATION DATES AND TIMES | OPERATING USER IDS | OPERATION DETAILS | OPERATED DEVICE IDS |
|---|---|---|---|
| 2008/03/26 10:00:00 | User-00002 | REFERENCE | |
| 2008/03/26 12:00:00 | User-00004 | SCAN REGISTRATION | MFP-00001 |
| 2008/03/27 13:00:00 | User-00001 | SCAN REGISTRATION | MFP-00002 |
| 2008/03/26 12:00:00 | User-00003 | PRINT | MFP-00001 |

| DEVICE IDS | ROOM IDS |
|---|---|
| MFP-00001 | Place-00001 |
| MFP-00002 | Place-00003 |
| MFP-00003 | Place-00002 |

| USER IDS | ROOM IDS | ROOM NAMES |
|---|---|---|
| User-00001 | Place-00003 | A B C |
| User-00002 | Place-00002 | X Y Z |
| User-00003 | Place-00003 | A B C |

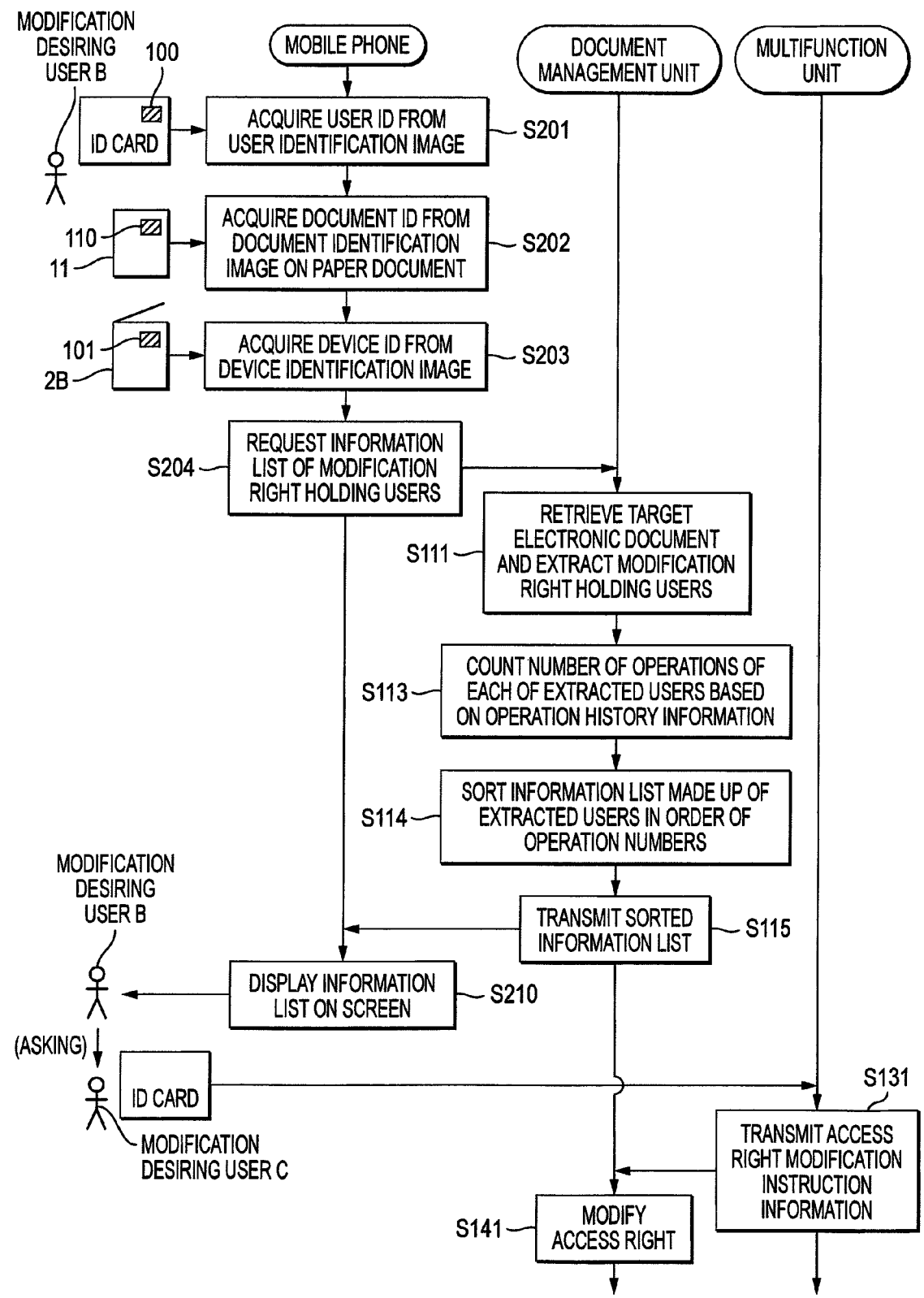

IMAGE PROCESSING SYSTEM, IMAGE PROCESSING APPARATUS, AUTHORIZED PERSON INFORMATION MANAGEMENT APPARATUS, IMAGE PROCESSING METHOD, AND COMPUTER READABLE MEDIUM

CROSS-REFERENCE TO RELATED APPLICATIONS

This application is based on and claims priority under 35 U.S.C. 119 from Japanese Patent Application No. 2008-207849 filed Aug. 12, 2008.

BACKGROUND

Technical Field

The present invention relates to an image processing system, an image processing apparatus, an authorized person information management apparatus, an image processing method, and a computer readable medium.

SUMMARY

According to an aspect of the present invention, an image processing system includes an authorized person information management apparatus and an image processing apparatus, the authorized person information management apparatus including: a first reception unit that receives information regarding a paper medium which contains data specifying information which specifies print source data of the paper medium; an authorized person information storage unit in which authorized person information, which denotes an authorized person having an authorization to process the print source data specified by the data specifying information contained in the information regarding the paper medium received by the first receiving unit, is stored while being associated with the print source data; an authorized person information acquisition unit that acquires the authorized person information from the authorized person information storage; and a first transmission unit that transmits the authorized person information acquired by the authorized person information acquisition unit; the image processing apparatus including: a reading unit that reads optically the paper medium which contains the data specifying information; a second transmission unit that transmits information regarding the paper medium which contains the data specifying information, and which is read by the reading unit to the authorized person information management unit; a second reception unit that receives the authorized person information transmitted by the first transmission unit; and an output unit that outputs the authorized person information received by the second reception unit.

BRIEF DESCRIPTION OF THE DRAWINGS

Exemplary embodiment of the present invention will be described in detail based on the following figures, wherein:

FIG. 2 is a diagram showing an example of an authentication history management table;

FIG. 3A is a diagram showing an example of an electronic document management table, and FIG. 3B is a diagram showing an example of an access right management table;

FIG. 8 shows an example of an operation history management table;

FIG. 11A shows an example of installation location information, and FIG. 11B shows an example of room location information;

FIG. 16 is a timing chart showing an example of an access right modifying operation in the image processing system according to the fifth embodiment of the invention.

DETAILED DESCRIPTION

Figure 1:
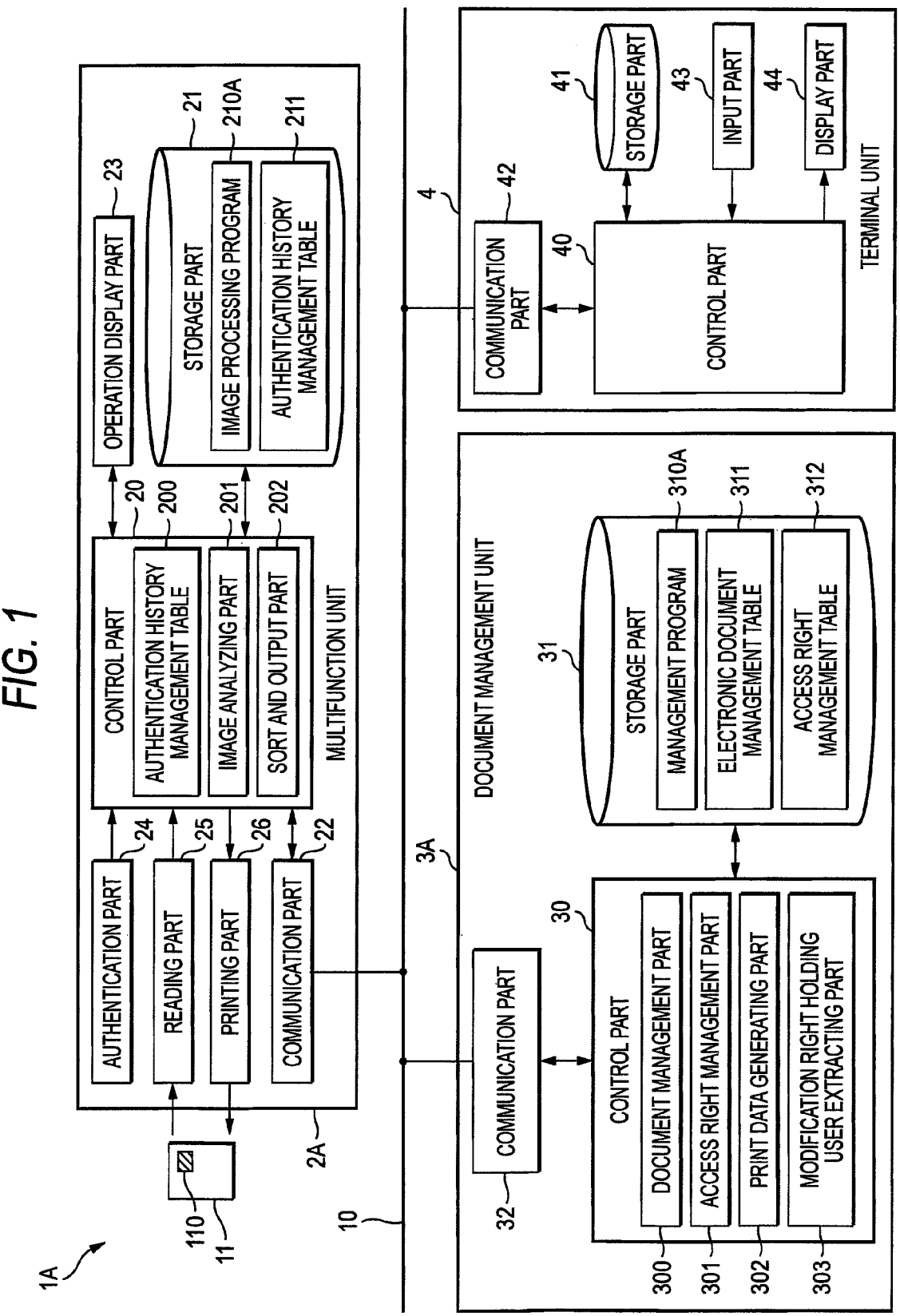
FIG. 1 is a block diagram showing an example of a schematic configuration of an image processing system according to a first embodiment of the invention.

An image processing system according to an embodiment of the invention has, for example, an authorized person information management unit and an image processing unit.

The authorized person information management unit includes a first reception means for receiving information regarding a paper medium containing data specifying information which specifies print source data of the paper medium, an authorized person information acquisition means for acquiring authorized person information denoting an authorized person having an authorization to process the print source data specified by the data specifying information contained in the information regarding the paper medium which was received by the first receiving means from an authorized person information storage means in which authorized person information is stored while being associated with the print source data, and a first transmission means for transmitting the authorized person information acquired by the authorized person information acquisition means.

The image processing unit includes a reading means for reading optically the paper medium containing the data specifying information, a second transmission means for transmitting information regarding the paper medium which contains the data specifying information and which was read by the reading means to the authorized person information management unit, a second reception means for receiving the authorized person information transmitted by the first transmission means, and an output means for outputting the authorized person information received by the second reception means.

In the configuration described above, when the data specifying information is read from the paper medium which the user utilizes by the reading means of the image processing unit, so as to be transmitted to the authorized person information management unit by the second transmission means, the data specifying information is then received by the first reception means of the authorized person information management unit, and the authorized person information acquisition means acquires the authorized person information denoting the authorized person having the authorization to process the print source data which is specified by the data specifying information. Then, the authorized person information is transmitted to the image processing unit by the first transmission means, and the output means of the image processing unit outputs the authorized person information. The user of the paper medium asks, based on the authorized person information outputted from the output means, the authorized person, for example, to modify the authorization to process the print source data or to print the print source data.

The "paper medium" includes the data specifying information which specifies an electronic document as print source data. The paper medium includes various types of media on which documents, photographs, diagrams, illustrations, hand-written characters and/or the like are recorded.

The "data specifying information" is a document identification image printed on the paper medium, and the document identification image includes a document ID for identifying an electronic document from a plurality of electronic documents. The document identification image may be a machine-readable code such as a two-dimensional code like a QR code (which is a registered trade name) and a glyph code (which is a registered trade name) or a one-dimensional code like a bar code or a document ID which is printed as it is as characters. In addition, the document ID may be a character string which is encrypted using a predetermined encryption method.

The "information regarding the paper medium" is information containing the data specifying information. The information regarding the paper medium which is transmitted by the second transmission means of the image processing unit may be, for example, a read image read by the reading means which contains the data specifying information as an image or information containing, as data, data specifying information obtained by performing an image analysis on the read image. In addition, when the information regarding the paper medium is transmitted as the read image, the authorized person information management unit may be made to perform the image analysis so as to obtain data specifying information as data.

The "authorized person information" is information which denotes the person who is given the authorization to process the print source data for utilization thereof. Access rights may be authorized individually to processing operations of print source data of an electronic document such as reading, writing, printing and copying of the print source data, and authorized persons may be assigned individually to the processing operations.

In addition, the access right includes the authorization of modification which authorizes a modification to the authorized person for the print source data. In addition, an access right to single print source data may be given to a plurality of users. The access right may be given not only to individual users but also to a group made up of individual users, or the access right may be so given in such a state that a plurality of electronic documents are made into a group. The access right may be such as to contain restricting conditions which restrict time, frequency and place where electronic documents can be used.

The reading means is realized by an image processing unit having a scanner function or image sensing function. As the image processing unit having the scanner function, for example, a multifunction unit or a scanner unit is used, and as the image processing unit having the image sensing function, for example, a mobile phone, a personal digital assistant (PDA) or a digital camera is used.

The second receiving means, the authorized person information acquisition means and the second transmission means are realized by an authorized person information management unit which may be made up, for example, of a computer, a server or a work station (WS). In respective embodiments which will be described below, a document management unit will be used as the authorized person information management unit.

The output means is realized by an authorized person information output unit having a display and output function or a print and output function. As the authorized person information output unit having the display and output function, for example, a multifunction unit, a mobile phone or a personal digital assistant (PDA) is used, and as the authorized person information output unit having the print and output function, for example, a multifunction unit or a printer is used. In addition, in a multifunction unit having both the functions, the display and output function and the print and output function may be selected as required.

First Embodiment

FIG. 1 is a block diagram showing an example of a schematic configuration of an image processing system according to a first embodiment of the invention. This image processing system 1A is made up of a multifunction unit 2A for printing a paper document 11 which contains a document identification image 110 and reading the document identification image 110 from the paper document 11 so printed, a document management unit 3A for managing electronic documents and access rights to the electronic documents, a terminal unit 4 for implementing various types of processing operations on the electronic documents within a range authorized by the access rights, and a network 10 for connecting the multifunction unit 2A and the document management unit 3A to each other.

The network 10 is a communication network such as LAN (Local Area Network) or Internet in which data are transmitted and received via a cable network (through electric cables, optical cables or the like) or a wireless network (through radio waves, infrared rays or the like). In addition, in the image processing system 1A depicted in FIG. 1, although there are provided only one multifunction unit 2A and one terminal unit 4A, two or more multifunction units 2A and two or more terminal units 4A may be provided.

(Multifunction Unit)

The multifunction unit 2A is made up of a control part 20 for controlling respective parts of the multifunction unit 2A which is realized by, for example, a CPU, a storage part 21 for storing various types of programs or data which is realized by, for example, a ROM, RAM or hard disk, a communication part (second transmission and reception means) 22 which is realized by, for example, a network interface card which is connected to the network 10, an operation display part (a display means) 23 including a touch panel display made by superimposing a touch panel on a surface of a display and a hard key such as a start key, an authentication part 24, which is realized by, for example, a wireless card reader, for implementing an authenticating operation by receiving a user ID which identifies a user from an ID card possessed by a user through a wireless communication, a reading part (a reading means) 25 for generating a read image as digital data by reading optically the paper document 11, a printing part 26 for forming a visualized image based on print data on the paper medium, and a facsimile communication part 27 connected to a telephone line network.

An image processing program 210A, which functions as an authorized person information processing program for executing operations on timing charts shown in FIGS. 4 and 6, which will be described later, and an authentication history management table (a user history information storage means) 211 are stored in the storage part 21. In addition, the details of the authentication history management table 21 will be described later.

The control part 20 operates based on the image processing program 210A of the storage part 21 so as to function as an authentication history management part 200 for managing the authentication history management table 211, an image analyzing part 201 for analyzing the image identification image 110 contained in the read image and a sort and output part 202 which functions as a sorting means and an outputting means.

The authentication management part 200 manages the authentication history management table 211, and when a device thereof is used by a user performing an authenticating operation in which his or her ID card is held to the authentication part 24, the authentication management part 200 registers authentication history information (utilization history information) which contains an operating user ID denoting the user who has performed the authenticating operation in the authentication history management table 211.

The image analyzing part 201 cuts out the document identification image 110 which is disposed in a predetermined area in the read image generated by the reading part 25 from the read image and performs an image analyzing operation on the document identification image 110 so cut out so as to acquire a document ID.

The sort and output part 202 sorts modification right holding user IDs contained in a list of information received from the document management unit 3A by the communication part 22 based on occurrence timing or occurrence frequency at which the user IDs occur in operating user IDs contained in the authentication history management table 211 of the storage part 21 by reference to the authentication management table 211. Then, the sort and output part 202 outputs users denoted by the modification right holding user IDs on to the operation display part 23 in the order in which they were sorted.

In this embodiment, the sort and output part 202 accumulates the numbers of occurrences of the modification right holding users in the authentication history management table 211 and sorts the modification right holding users in the order in which the occurrence frequency increases. In addition, in obtaining occurrence frequencies, the sort and output part 202 may take authenticating operations which are restricted to a predetermined period of time. Additionally, the sort and output part 202 may sort the modification right holding users in the order in which occurrence timings at which the modification right holding users occur in the authentication history management table 211 are closer to the current timing. Note that timing may be specified in detail in hour, minute or second or specified roughly in day, month or year. Alternatively, timing may be specified in other ways.

In addition, in this embodiment, although the sort and output part 202 is made to output the users denoted by the modification right holding user IDs on the operation display part 23, the sort and output part 202 may be made to output the users to the printing part 26.

The authentication part 24 includes a wireless communication circuit which, when an authenticating operation using an ID card is performed, starts a wireless communication with the ID card using an electromagnetic induction action or radio waves and an authenticating part which implements an authenticating operation based on an user ID which is read from the ID card.

The reading part 25 includes a document table on which a paper document 11 is placed piece by piece, an ADF (automatic document feeder) which automatically feeds paper documents 11 piece by piece to the document table, a photoelectric transducer which optically reads a paper document 11 fed from the ADF and an A/D converter which converts an analog signal outputted from the photoelectric transducer into a digital signal.

The printing part 26 can adopt a printing method such as an electrophotographic method, an inkjet method, and a thermal transfer method. The printing part 26 prints the paper document 11 based on print data transmitted from the document management unit 3A.

(Document Management Unit)

The document management unit 3A is made up of a control part 30, which is realized by, for example, a CPU, for controlling respective parts of the document management unit 3A, a storage part 31, which is realized by, for example, a ROM, RAM or hard disk, for storing various types of programs and data and a communication part (a first transmission means) 32 connected to the network 10 which is realized by, for example, a network interface card.

Stored in the storage part 31 are a management program 310A which is an authorized person information processing program which executes operations of timing charts shown in FIGS. 4 and 6, which will be described later, an electronic document management table 311 and an access right management table 312 (an authorized person information storage means). In addition, the electronic document management table 311 and the access right management table 312 will be described in detail later.

The control part 30 operates based on the management program 310A in the storage part 31 so as to function as a document management part 300 for managing electronic documents, an access right management part 301 for managing access rights, a print data generating part 302, and a modification right holding user extraction part (an authorized person information acquisition means) 303.

The document management part 300 manages the electronic documents management table 311 and implements a retrieving operation in which an electronic document corresponding to a document ID is retrieved from the electronic document management table 311.

The access right management part 301 manages the access right management table 312, and when an electronic document is requested to be processed, the access right management part 301 determines whether or not such a request is authorized. In addition, the access right management part 301 modifies the access right management table 312 based on access right modification instruction information.

The print data generating part 302 creates a document identification image 110 based on a document ID of an electronic document and generates print data by integrating the document identification image 110 into the electronic document in such a manner that the identification image 110 so created is printed in a predetermined position of the paper document 11.

The document identification image 110 is created, for example, by encrypting the document ID using a predetermined encryption method and converting the character string so encrypted into a machine-readable code.

The modification right holding user extraction part 303 extracts modification right holding users who are given modification rights to a predetermined electronic document by reference to the access right management table 312 in the storage part 31 and creates an information list which is made up of the modification right holding users so extracted.

(Terminal Unit)

The terminal unit 4 is made up of a control part 40, which is realized by, for example, a CPU, for controlling respective parts of the terminal unit 4, a storage part 41, which is realized by, for example, a ROM, RAM or hard disk, for storing various types of programs and data, a communication part 42 connected to the network 10 which is realized by, for example, a network interface card, an input part 43, which is realized by, for example, a keyboard or mouse, for receiving a data input operation, and a display part 44, which is realized by, for example, a liquid crystal display, for displaying various types of screens.

The terminal unit 4 that is configured as described above can be made up, for example, of a computer, a personal digital assistant (PDA) or a mobile phone.

FIG. 2 is a diagram showing an example of an authentication history management table. Information on authenticating operations based on authenticating operations performed by users are recorded on respective records in the authentication history management table 211. As is illustrated in FIG. 2, the authenticating operation information includes authentication dates and times where authenticating operations were performed, operating user IDs (user information) which denote users who performed the authenticating operations and success or failure in establishing authentications of the authenticating operations by the authentication part 24.

FIG. 3A is a diagram showing an example of an electronic document management table. Recorded in this electronic document management table 311 are document titles given to electronic documents using their document IDs for identifying the electronic documents as a key and given access right IDs which are used to associate access rights to the electronic documents with the access right management table 312. Note that the electronic document management table 311 may be such as to include real data of the electronic documents or such as to include reference location data which denote storage places of the electronic documents.

FIG. 3B is a diagram showing an example of an access right management table. Recorded in this access right management table 312 are users who are given access rights to operations to be performed on the electronic documents using access right IDs as a key. Namely, recorded in the access right management table 312 are reading right holding user IDs denoting users who are given access rights to reading operation, printing right holding user IDs denoting users who are given access rights to writing operation and modification right holding user IDs denoting users who are given modification rights.

(Operation of First Embodiment)

Next, an example of an operation of the image processing system 1A according to the first embodiment of the invention will be described by reference to FIGS. 4 to 6.

(Printing Operation of Paper Document)

Figure 4:
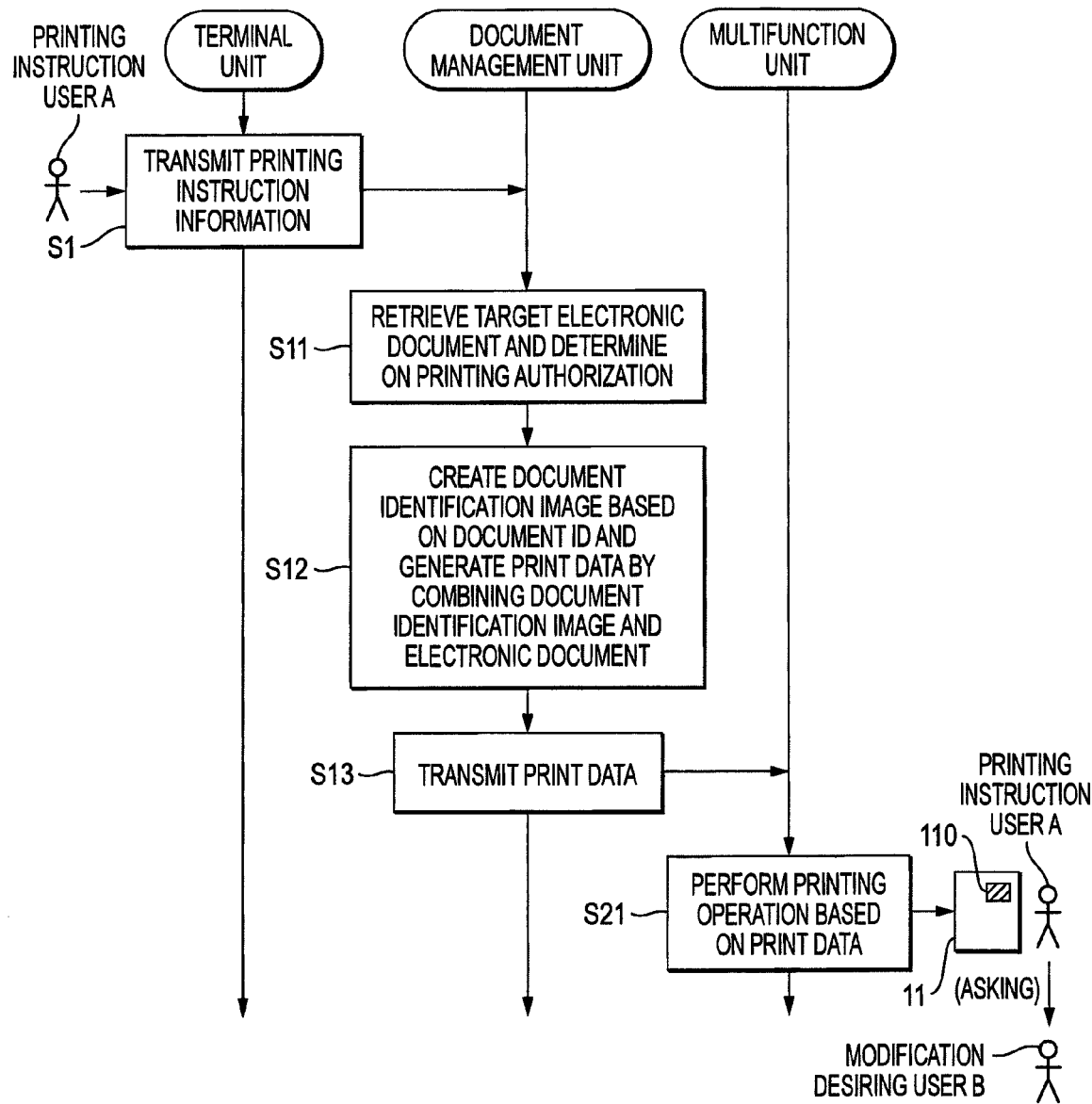
FIG. 4 is a timing chart showing an example of a printing operation in printing a paper document in the image processing system.

FIG. 4 is a timing chart showing an example of a printing operation in printing a paper document in the image processing system 1A. Here, a user who instructs the printing of a paper document 11 is referred to as a printing instructing user A.

Firstly, the printing instructing user A logs in to the terminal unit 4 by inputting authenticating information such as his or her own user ID and password into the terminal unit 4. When the terminal unit 4 authorizes the login based on the authenticating information, the printing instructing user A performs a printing instructing operation by designating an electronic document to be printed by, for example, its document ID and designating a multifunction unit 2A in an output location.

On accepting of the printing instructing operation, the terminal unit 4 transmits printing instruction information based on the printing instructing operation to the document management unit 3A via the network 10 (S1). In addition, this printing instruction information includes the user ID denoting the printing instructing user A, the document ID denoting the electronic document to be printed, output location information denoting a multifunction unit 2A in the output location, and printing parameters such as single side or double sides and monochrome or color.

Next, when receiving the printing instruction information via the communication part 32, the document management part 300 of the document management unit 3A retrieves an electronic document which corresponds to the document ID contained in the printing instruction information. Then, the access right management part 301 performs a printing authorization determination in which whether or not an authorization to print the electronic document can be given to the printing instructing user A (S11).

Here, the printing authorization determination is performed by reference to the electronic document management table 311 and the access right management table 312. Specifically, the access right management part 301 acquires a given access right ID corresponding to the electronic document specified by the retrieving operation by the document management part 300 from the electronic document management table 311. Then, the access right management part 301 determines whether or not the requested printing operation is authorized based on whether or not the user ID of the printing instructing user A is included in a string of printing instructing user IDs of a record which corresponds to the given access right so acquired.

As a result of the determination, when the user ID of the printing instructing user A is contained in the string of printing instructing user IDs, the access right management part 301 sends an authorization of printing operation to the print data generating part 302. Here, although an operation occurring when the printing operation is authorized will be described below, in the event that the user ID of the printing instructing user A is not contained, the printing operation is discontinued.

When the printing operation is authorized as a result of the printing authorization determination, the print data generating part 302 creates a document identification image 110 based on the document ID and generates print data by combining the identification image and the electronic document (S12). The control part 30 makes the communication part 32 transmit the print data to the multifunction unit 2A via the network 10 (S13).

When receiving the print data by way of the communication part 22, the control part 20 of the multifunction unit 2A makes the printing part 26 print the paper document 11 based on the print data so received (S21).

The multifunction unit 2A prints the paper document 11 in which the document identification image 110 is disposed in the predetermined position in the way described above. Then, the printing instructing user A obtains the paper document 110 printed by the multifunction unit 2A and distributes copies of the paper document 110 as a material for a conference.

(Access Right Modifying Operation)

Figure 6:
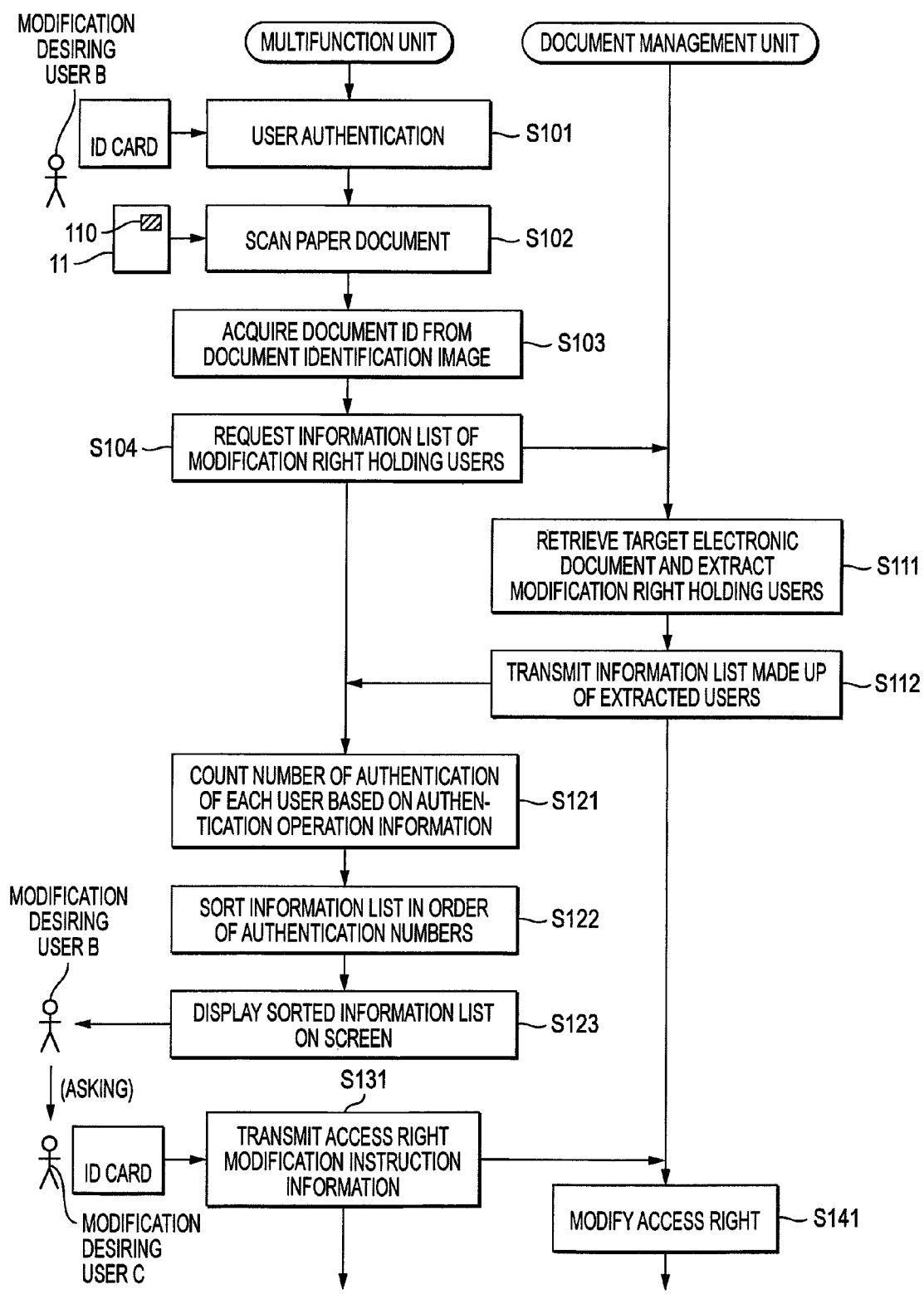
FIG. 6 is a timing chart showing an example of an access right modifying operation in the image processing system according to the first embodiment of the invention.

FIG. 6 is a timing chart showing an example of an access right modifying operation when modifying an access right to an electronic document which corresponds to a paper document in the image processing system 1A. Here, a user B to which a paper document 11 is distributed is referred to as a modification desiring user B who desires a modification to an access right.

(1) Reading of Paper Document

Firstly, when the modification desiring user B performs an authenticating operation using his or her own ID card on the authentication part 24 of the multifunction unit 2A, the authentication part 24 reads a user ID from the ID card through a wireless communication and performs an authenticating operation to determine whether or not authentication is established based on the user ID so read (S101). In addition, the authentication history management part 200 registers authentication history information based on the authenticating operation in the authentication history management table 211.

Next, when the authentication is established, the control part 20 displays an operation screen on which a scanning operation is performed on the display part 23. The modification desiring user B instructs the reading of the paper document 11 distributed from the printing instructing user U on the operation screen so displayed and performs a scan instructing operation by placing the paper document 11 on the ADF of the multifunction unit 2A. When accepting the scan instructing operation, the control part 20 performs a scanning operation in which the reading part 25 is caused to read the paper document 11 and a read image based on the paper document 11 is generated (S102).

Next, the image analyzing part 201 cuts out the document identification image from the read image generated through the scanning operation and acquires character string information by performing an image analyzing operation on the document identification image 110 so cut out. Then, the image analyzing part 201 decodes the character string information using a predetermined encryption method, so as to acquire a document ID (S103).

Then, the control part 20 transmits an information list acquisition request requesting a transmission of an information list of modification right holding users to an electronic document corresponding to the document ID so acquired (S104).

(2) Display of Modification Right Holding Users on Screen

When receiving the information list acquisition request, the document management part 300 of the document management unit 3A retrieves an electronic document which corresponds the document ID of the information list acquisition request by reference to the electronic document management table 311 and sends a given access right ID corresponding to the electronic document which has been specified through the retrieving operation to the access right management part 301.

Next, the access right management part 301 extracts modification right holding users by referring to a string of modification right holding user IDs in relation to a record corresponding to the given access right ID in the access right management table 312 (S111). Then, the control part 30 transmits an information list made up of the modification right holding user IDs so extracted to the multifunction unit 2A by way of the communication part 32 (S112).

When receiving the information list, the authentication history management part 200 of the multifunction unit 2A counts the number of authenticating operations performed for individual users denoted by the modification right holding user IDs contained in the information list so received by reference to the authentication history management table 211 (S121). Namely, the authentication history management part 200 counts the number of records in which the user IDs recorded in the string of operating user IDs of the authentication history management table 211 coincide with the modification right holding user IDs for the individual modification right holding users, and the number of records so counted are then referred to as the number of authentications.

Next, the sort and output part 202 sorts the modification right holding user IDs contained in the information list in the order in which the number of authentications counted by the authentication history management part 200 increases (S122). Then, the sort and output part 202 displays a modification right holding user list screen 12 which displays the users denoted by the modification right holding user IDs in the sorted order on the operation display part 23 (S123).

Figure 5:
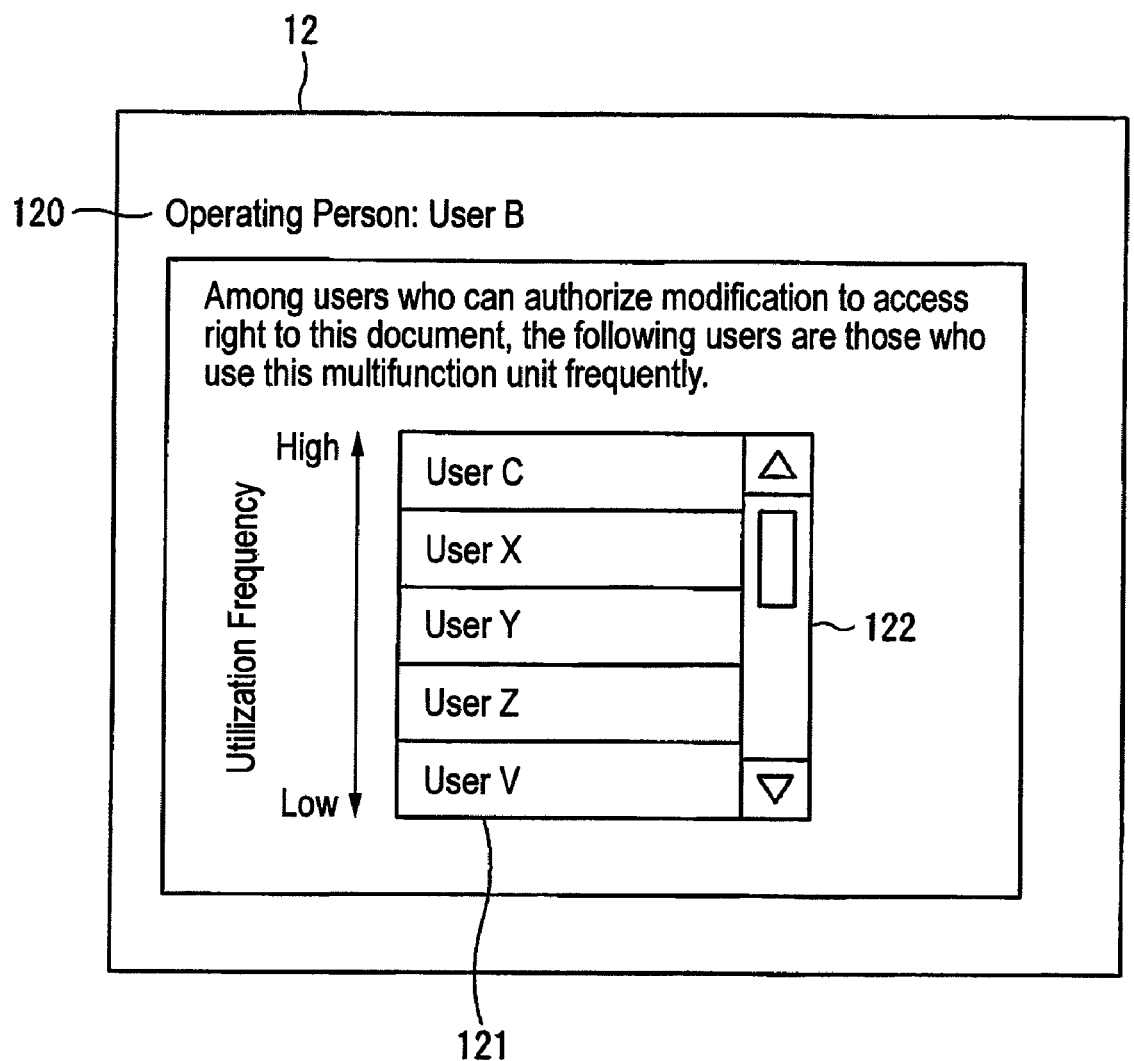
FIG. 5 is a screen showing an example of a modification right holding user list screen.

FIG. 5 shows a screen depicting an example of a modification right holding user list screen. In this modification right holding user list screen 12, an operating person display column 120 is provided at an upper portion where a user who is currently operating the multifunction unit 2A, that is, a modification desiring user B is displayed, a modification right holding user list 121 is provided at a central portion on which the modification right holding users are listed, and a scroll bar 122 is provided also at the central portion which is used to scroll vertically through the modification right holding user list 121.

On the modification right holding user list 121, modification right holding users are displayed sequentially from the top in the order in which they were sorted by the sort and output part 202. Namely, a modification right holding user having a large number of authentications performed on the multifunction unit 2A is displayed in a relatively upper position on the modification right holding user list 121, compared with a modification right holding user having a small number of authentications. Note that although the modification right holding user list 121 shown in FIG. 5 is shown as being sorted in the order of authentication numbers, the purpose of the list is to specify the users whose authentication numbers are large. Therefore, the authentication numbers may be displayed, or the modification right holding users whose authentication numbers are large may be displayed in such a manner as to be specified by marks or colors.

(3) Modification of Access Right

The modification desiring user B visualizes the modification right holding user list 121 displayed on the operation display part 23 sequentially from the top thereof and selects the user whom the modification desiring user B asks to modify the access right from the modification holding users displayed. Then, the modification desiring user B asks the user C so selected to modify the access right to the electronic document. Here, the selected user is referred to as a modification instructing user C, and the modification desiring user B is understood to have asked the modification instructing user C to give a writing right and a printing right as an access right given to each processing operation. Note that the modification instructing user C may be the same person as the printing instructing user A.

When deciding to accept the request from the modification desiring user B to modify the access right, the modification instructing user C performs an access right modification instructing operation by holding his or her own ID card to the authentication part 24 of the multifunction unit 2A.

When accepting the modification instructing operation, the control part 20 makes the authentication part 24 to read a user ID from the ID card. Then, when authentication is established by the user ID so read, the control part 20 transmits access right modification instruction information to the document management unit 3A (S131). In addition, the access right modification instruction information includes a modification desiring user ID denoting the modification desiring user B, a modification instructing user ID denoting the modification instructing user C, a document ID denoting an electronic document which constitutes a target document an access right to which is to be modified and given contents (here, a writing right and a printing right) of an access right given to the modification desiring user B.

Next, when receiving the access right modification instruction information, the document management part 300 of the document management unit 3A retrieves an electronic document which corresponds to the document ID contained in the access right modification instruction information by reference to the electronic document management table 311. Then, the document management part 300 sends a given access right ID corresponding to the document ID contained in the access right modification instruction information, the modification desiring user ID contained in the access right modification instruction information, the modification instructing ser ID and the given contents of the access right to the access right management part 301.

Next, by reference to a string of modification right holding user IDs in a record corresponding to the given access right ID in the access right management table 312, the access right management part 301 performs a modification authorizing determination in which whether or not an authorization of modification to the access right is given based on whether or not the user ID of the modification instructing user C is contained in the string.

Then, when the user ID of the modification instructing user C is contained, the access right management part 301 authorizes the modification to the access right and adds the modification desiring user ID to the access rights denoted by the given contents, here, the strings of wiring right user IDs and printing right user IDs (S141). In addition, when the user ID of the modification instructing user C is not contained in the string of the modification right holding user IDs, the modifying operation of the access right is discontinued.

The modification right holding users of the electronic document specified by the document identification image 110 of the paper document 11 are displayed in the form of a list in the order in which the number of authentications performed on the multifunction unit 2A is increased, that is, in the order of probability in which the modification right holding user resides on the periphery of the multifunction unit 2A in the way described above. Then, the modification desiring user B asks the modification right holding user selected from the list of modification right holding users to modify the access right and performs a desired operation on the electronic document after the access right has been modified accordingly.

Second Embodiment

Figure 7:
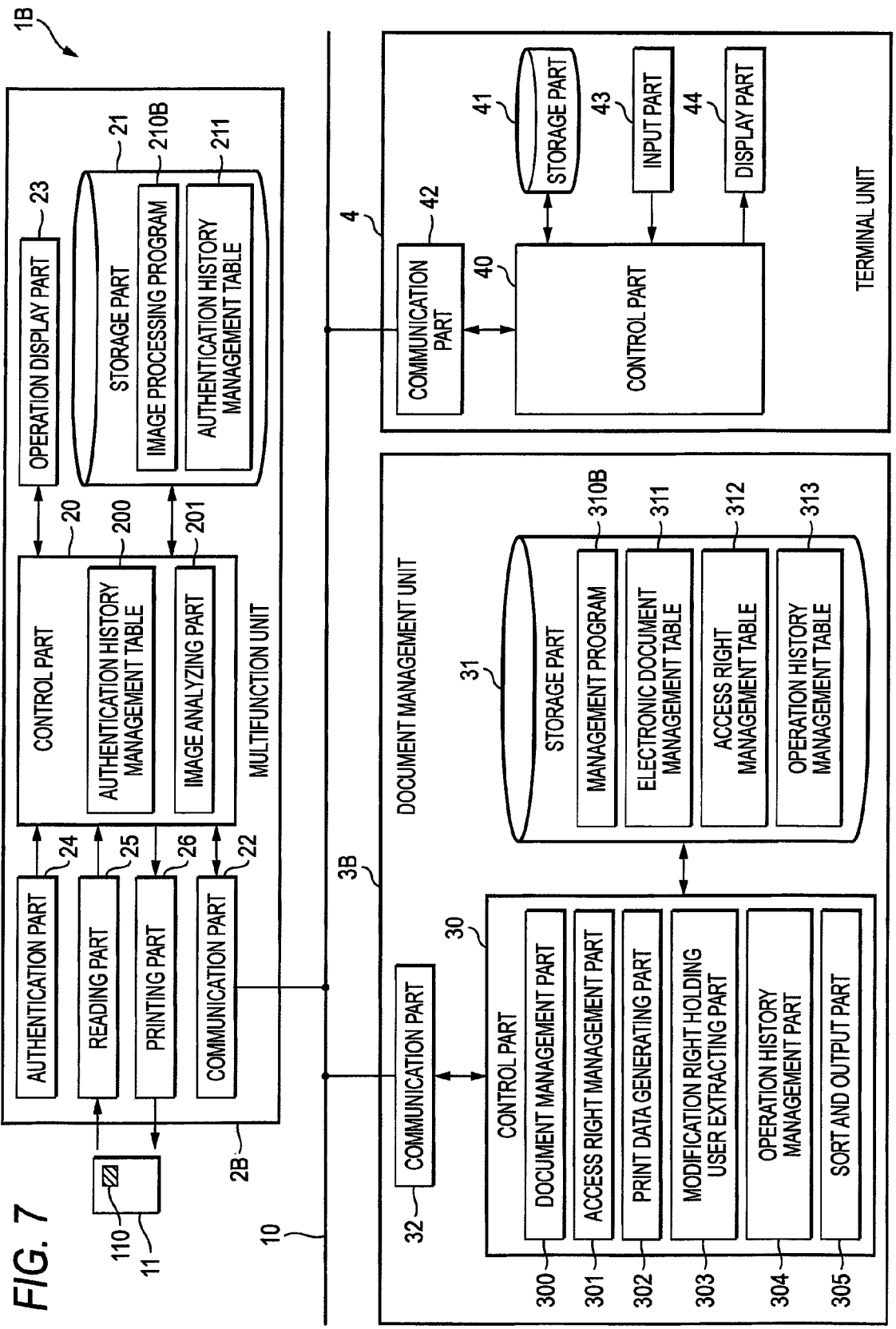
FIG. 7 is a block diagram showing an example of a schematic configuration of an image processing system according to a second embodiment of the invention.

FIG. 7 is a block diagram showing an example of a schematic configuration of an image processing system according to a second embodiment of the invention. In the image processing system 1A according to the first embodiment, the sort and output part 202 of the multifunction unit 2A sorts the modification right holding users in the order in which the authentication number or frequency increases based on the authentication history management table 211. In contrast to this, in an image processing system 1B according to this embodiment, a document management unit 3B includes a sort and output part 305 which stores operation history information on operations performed by users in an operation history management table 313 and sorts modification right holding users in the order in which the operation number or frequency increases based on the operation history management table 313.

A multifunction unit 2B is configured in the same manner as that in which the multifunction unit 2A according to the first embodiment is configured except that a control part 20 includes no sort and output part 202. In addition, a terminal unit 4 and a network 10 are configured in the same manners as the first embodiment.

(Document Management Unit)

As with the document management unit 3A according to the first embodiment, the document management unit 3B is made up of a control part 30, a storage part 31 and a communication part 32.

In addition to an electronic document management table 311 and an access right management table 312 which are similar to those of the first embodiment, a management program 310B which executes operations in a timing chart shown in FIG. 9, which will be described later, and an operation history management table 313 are stored in the storage part 31.

The control part 30 operates based on the management program 310B to thereby function as an operation history management part 304 and a sort and output part 305. In addition, as with the first embodiment, the control part 30 functions as a document management part 300, an access right management part 301, a print data generating part 302 and a modification right holding user extracting part 303.

FIG. 8 shows an example of an operation history management table. Operation history information based on operations performed on electronic documents is recorded in respective records in the operation history management table 313. As is shown in FIG. 8, the operation history information includes operation dates and times when operations were performed, operating user IDs denoting users who performed the operations, operation contents performed by the users and an operated device ID denoting a multifunction unit designated as an output location where for example, printing is implemented or a terminal unit which the user operated from devices connected to the network 10, that is, multifunction units and terminal units.

(Operation of Second Embodiment)

Figure 9:
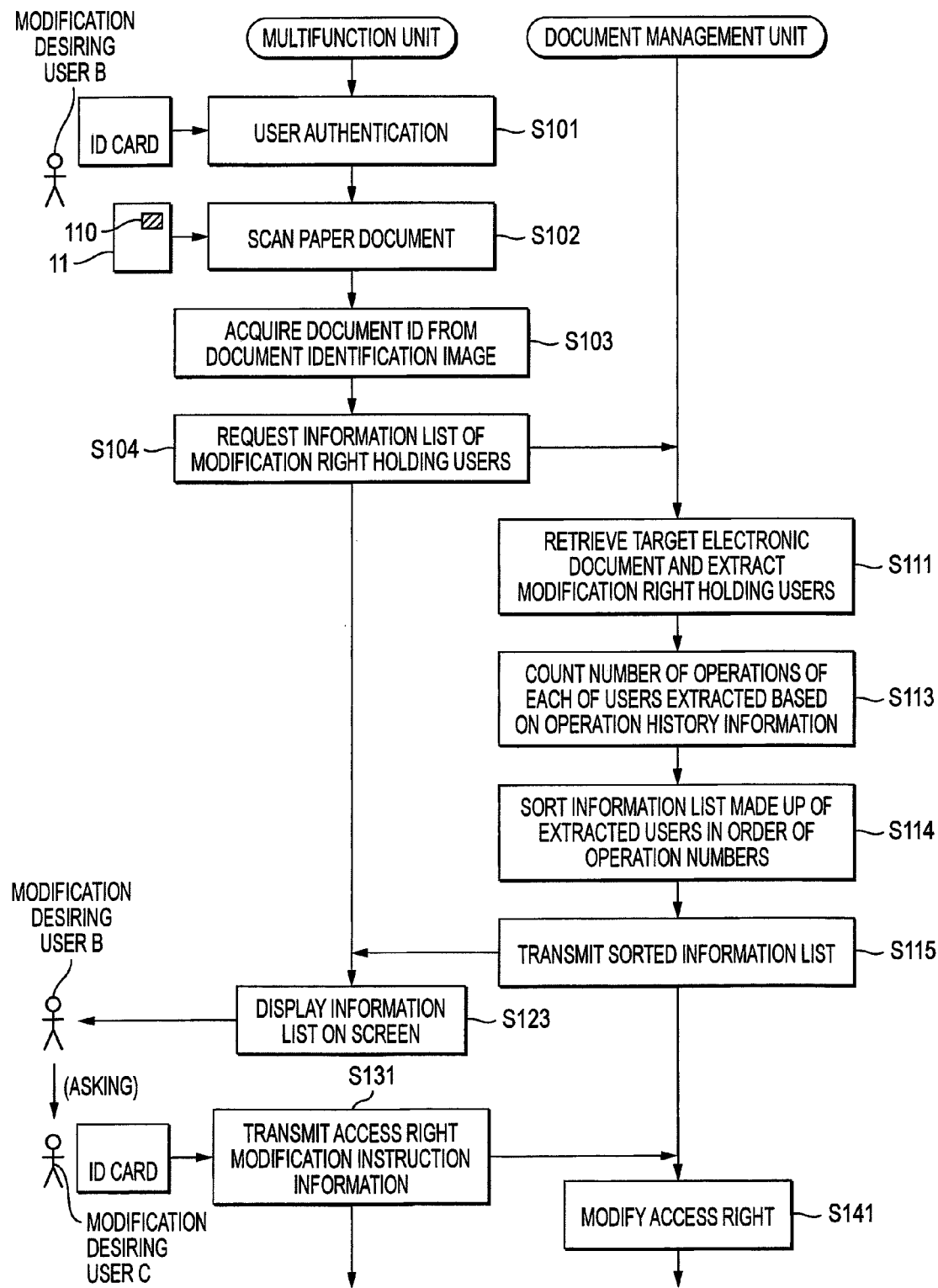
FIG. 9 is a timing chart showing an example of an access right modifying operation in the image processing system according to the second embodiment of the invention.

FIG. 9 is a timing chart showing an example of an access right modifying operation in the image processing system 1B. In addition, since a printing operation of a paper document is similar to that of the first embodiment, the description thereof will be omitted.

(1) Reading of Paper Document

When a modification desiring user B performs an authenticating operation, an authentication part 24 of the multifunction unit 2B performs an authenticating operation (S101). When authentication is established as a result of the authenticating operation, the modification desiring user B performs a scan instructing operation using a paper document 11 to be read.

When accepting the scan instructing operation, the multifunction unit 2B performs, as with the first embodiment, a scanning operation by a reading part 25 (S102) and a image analyzing operation of an identification image by an image analyzing part 201 (S103). Then, the control part 20 sends an information list acquisition request to the document management unit 3B (S104), the information list containing the document ID obtained by the image analyzing part 201 and the device ID denoting the multifunction unit 2B on which the scan instructing operation was performed.

(2) Display of Modification Right Holding Users on Screen

When receiving the information list acquisition request, as with the first embodiment, in the document management unit 3B, the modification right holding user extracting part 303 extracts modification right holding users (S111).

Next, referring to the operation history management table 313, the operation history management part 304 counts the number of operations performed on the multifunction unit specified by the device ID contained in the information list acquisition request for each of the modification right holding users so extracted (S113).

Next, the sort and output part 305 sorts the modification right holding users contained in the information list in the order in which the operation number or frequency counted by the operation history management part 304 increases (S114).

Then, the sort and output part 305 transmits the information list which holds the state in which the modification holding users are sorted in the order in which the operation number or frequency increases to the multifunction unit 2B (S115).

When receiving the information list, the control part 20 of the multifunction unit 2B displays a modification right holding user list screen 12 on an operation display part 23 (S123). A state in which the modification right holding users are sorted based on the number of operations performed on the device thereof by the sort and output part 305 is displayed on a modification right holding user list 121 here.

(3) Modification to Access Right

When the modification desiring user B visualizes the modification right holding user list screen 12 and asks a modification instructing user C to modify the access right, and the modification is authorized, as with the first embodiment, access right modification instruction information based on a modification instructing operation by the modification instructing user C is transmitted to the document management unit 3B (S131), and the access right is modified by the document management unit 3B (S141)

Third Embodiment

Figure 10:
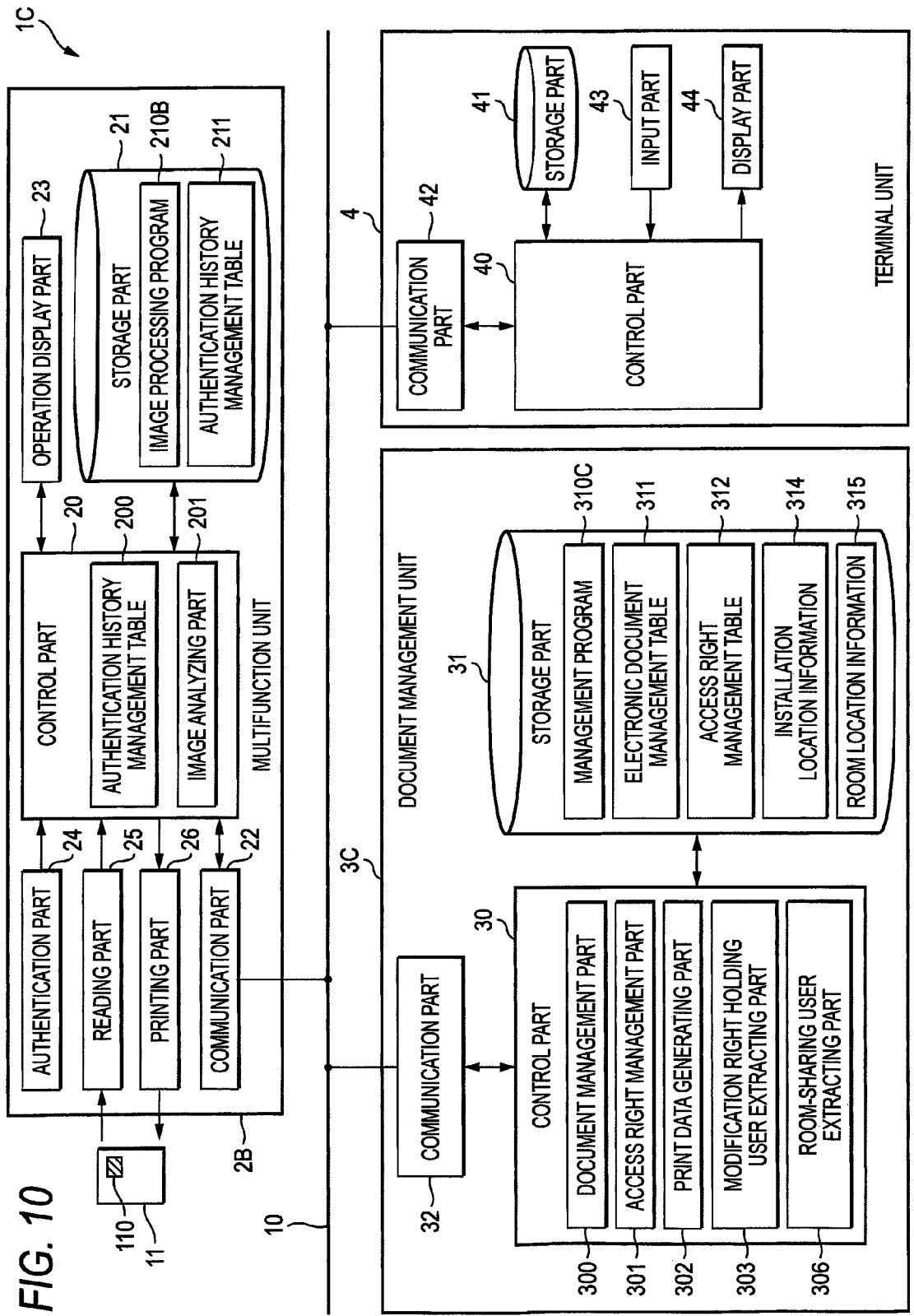
FIG. 10 is a block diagram showing an example of a schematic configuration of an image processing system according to a third embodiment of the invention.

FIG. 10 is a block diagram showing an example of a schematic configuration of an image processing system according to a third embodiment of the invention. In the image processing system 1B according to the second embodiment, the sort and output part 305 of the document management unit 3B sorts the modification right holding users in the order in which the operation number or frequency increases based on the operation history management table 313. In contrast to this, in an image processing system 1C according to this embodiment, a storage part 31 of a document management unit 3C includes a room-sharing user extracting part 306 which stores installation location information 314 on locations where multifunction units are installed and room location information (user location information) 315 on locations where the users reside and extracts a modification right holding user residing in the same room as a multifunction unit 2C based on the installation location information 314 and the room location information 315.

The multifunction unit 2C is configured in the same manner as that in which the multifunction unit 2A according to the first embodiment is configured except that a control part 20 includes no image analyzing part 201. In addition, a terminal unit 4 and a network 10 are configured in the same manners as the first embodiment.

(Document Management Unit)

The document management unit 3C is made up of a control unit 30, a storage unit 31 and a communication part 32, as with the document management unit 3B according to the second embodiment.

In addition to an electronic document management table 311 and an access right management table 312 which are similar to those of the second embodiment, a management program 310C which executes operations in a timing chart shown in FIG. 12, which will be described later, the installation location information 314 and the room location information 315 are stored in the storage part 31.

The control part 30 operates based on the management program 310C to thereby function as the room-sharing user extracting part 306. In addition, as with the second embodiment, the control part 30 functions as a document management part 300, an access right management part 301, a print data generating part 302 and a modification right holding user extracting part 303.

Referring to the installation location information 314 and the room location information 315 which are stored in the storage part 31, the room-sharing user extracting part 36 extracts a modification right holding user contained in an information list whose room location coincides with an installation location of the multifunction unit 2C, that is, a modification right holding user who resides in the same room as the multifunction unit 2C. In place of extracting the room-sharing user, the room-sharing user extracting part 306 may be made to calculates distance information between the room location and the installation location from, for example, IP addresses or addresses so as to sort modification right holding users contained in the information list in the order in which the distance between the room location and the installation location decreases.

FIG. 11A shows an example of installation location information. In this installation location information 314, room IDs and room names which denote rooms where the respective devices are installed are recorded using device IDs as a key.

FIG. 11B shows an example of room location information. In this room location information 315, room IDs and room names which denote rooms where users reside are recorded using user IDs as a key. In addition, static information which shows a room in which a seat of each user is installed may be used as the room location information 315. Alternatively, dynamic information may be used which shows rooms where users are currently residing from an ingress and egress management unit which manages an ingress and egress status of each user.

(Operation of Third Embodiment)

Figure 12:
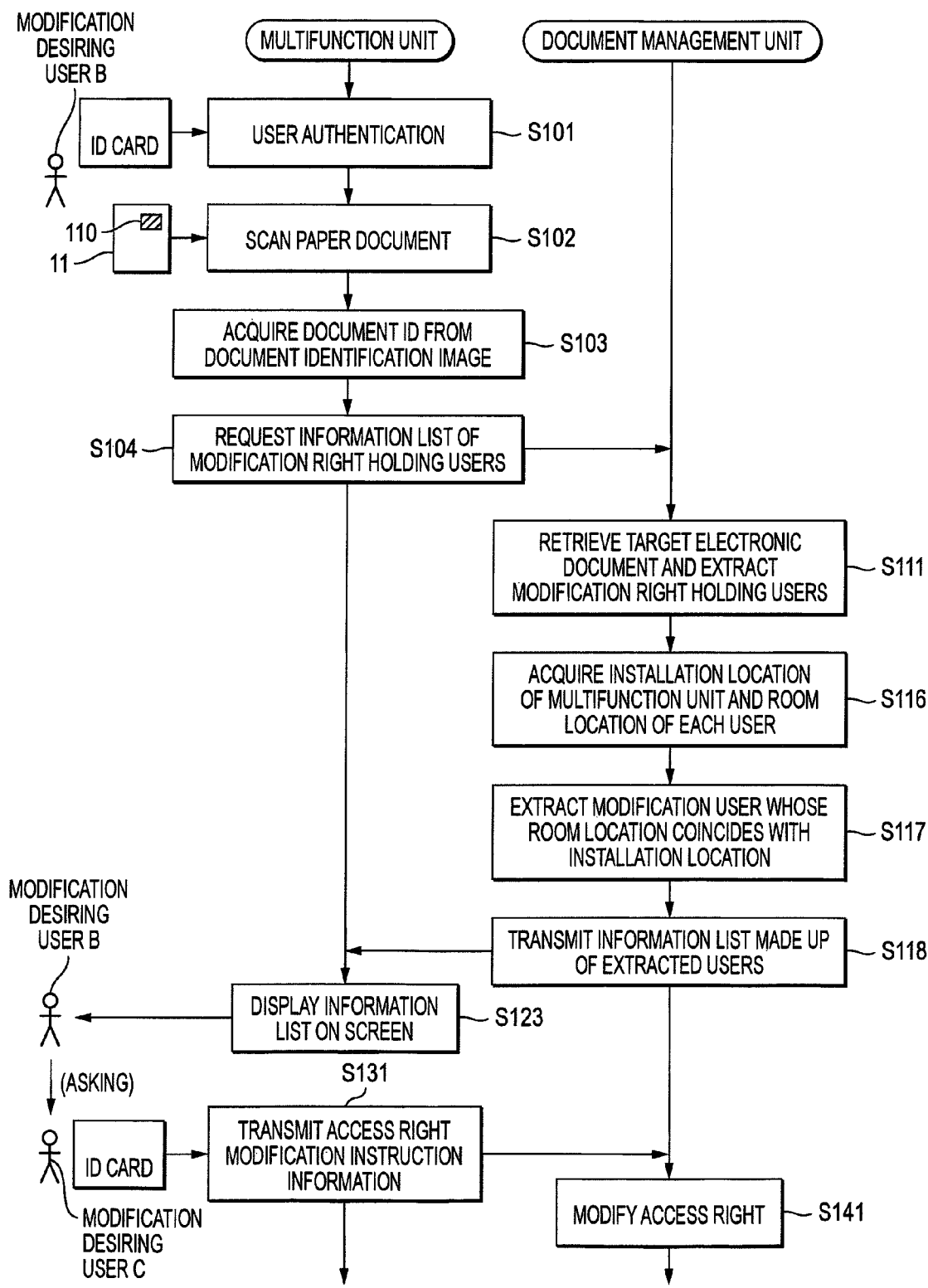
FIG. 12 is a timing chart showing an example of an access right modifying operation in the image processing system according to the third embodiment of the invention.

FIG. 12 is a timing chart showing an example of an access right modifying operation in the image processing system 1C. In addition, since a printing operation of a paper document is similar to that of the first embodiment, the description thereof will be omitted here.

(1) Reading of Paper Document

When a modification desiring user B performs an authenticating operation, an authentication part 24 of the multifunction unit 2C performs an authenticating operation (S101). When authentication is established as a result of the authenticating operation, the modification desiring user B performs a scan instructing operation using a paper document 11 which constitutes a target document to be read.

When accepting the scan instructing operation, the multifunction unit 2C performs a scanning operation by a reading part 25 (S102) and an image analyzing operation of analyzing the identification image by an image analyzing part 201

(S103), as with the first embodiment. Then, a control part 20 transmits an information list acquisition request to the document management unit 3C (S104), an information list containing a document ID acquired by the image analyzing part 201 and a device ID denoting the multifunction unit 2C on which the scan instructing operation was performed.

(2) Display of Modification Right Holding Users on Screen

When receiving the information list acquisition request transmitted thereto, as with the first embodiment, in the document management unit 3C, modification right holding users are extracted by the modification right holding user extracting part 303 (S111).

Next, referring to the installation location information 314, the room-sharing user extracting part 306 acquires an installation location where the multifunction unit denoted by the device ID is installed. In addition, referring to the room location information, the room-sharing user extracting part 306 acquires a room location for each of the modification right holding users so extracted (S116).

Next, the room-sharing user extracting part 306 extracts a modification right holding user whose room location acquired in the step S116 coincides with the installation location of the multifunction unit 2C from the modification right holding users which were extracted in the step S111 (S117).

Next, the control part 30 transmits an information list which is made up of the modification right holding users whose room locations coincides with the installation location to the multifunction unit 2C (S118).

Then, when receiving the information list, the control part 20 of the multifunction unit 2C displays a modification right holding user list screen 12 on an operation display part 23 (S123). The modification right holding users whose room locations coincide with the installation location are displayed on a modification right holding user list 121 produced here.

(3) Modification to Access Right

When the modification desiring user B visualizes the modification right holding user list screen 12 and asks a modification instructing user C to modify the access right, and the modification is authorized, as with the first embodiment, access right modification instruction information based on a modification instructing operation by the modification instructing user C is transmitted to the document management unit 3C (S131), and the access right is modified by the document management unit 3C (S141)

Fourth Embodiment

Figure 13:
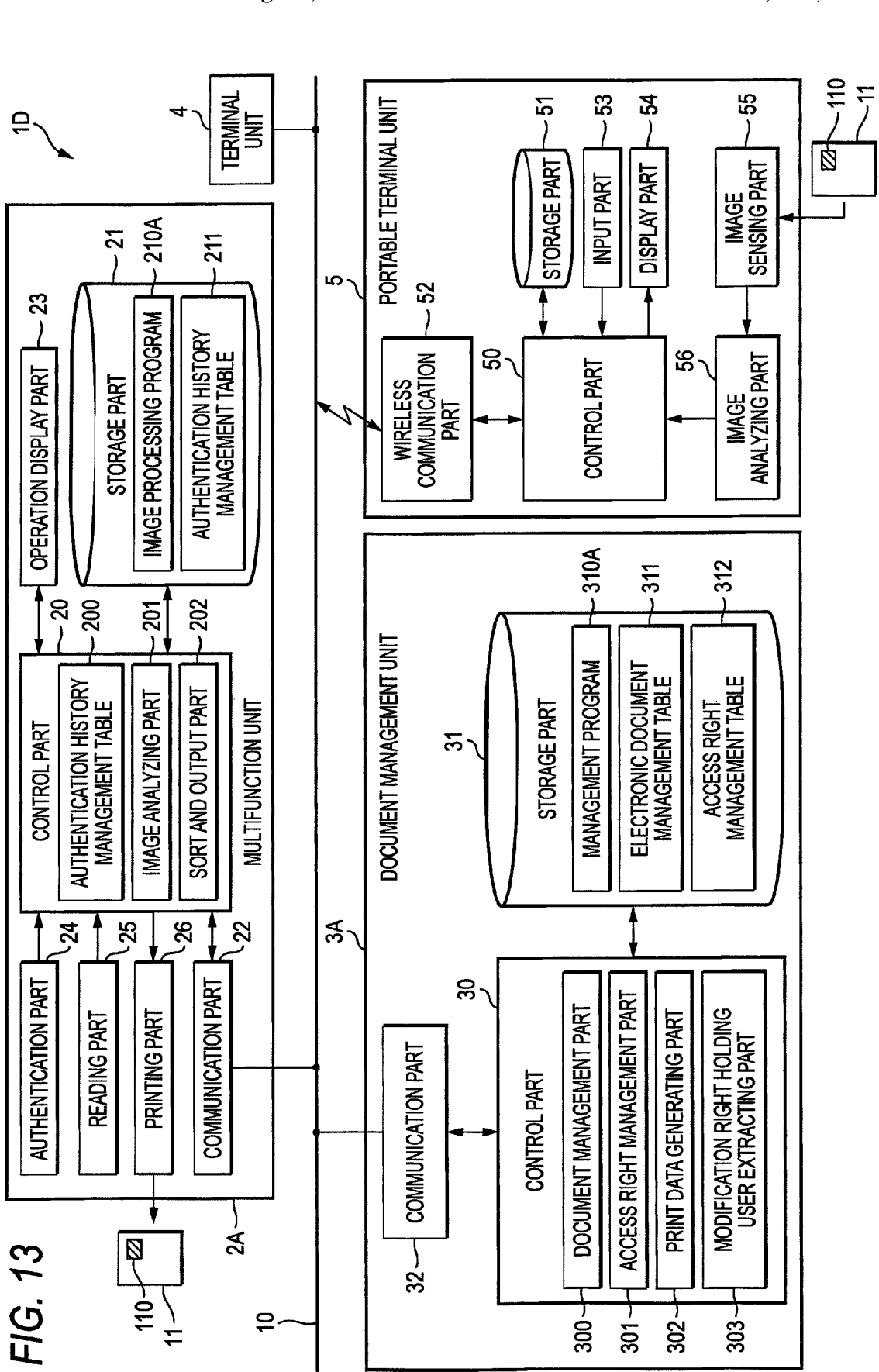
FIG. 13 is a block diagram showing an example of a schematic configuration of an image processing system according to a fourth embodiment of the invention.

FIG. 13 is a block diagram showing a schematic configuration of an image processing system according to a fourth embodiment of the invention. In the image processing system 1A of the first embodiment, the multifunction unit 2A transmits the information list acquisition request to the document management unit 3A and displays the modification right holding user list screen 12 on the display part 54. In contrast to this, an image processing system 1D according to this embodiment includes a portable terminal unit 5 which captures or senses a document identification image 110, a device identification image 101 and a user identification image 100 for implementation of an image analyzing operation.

Namely, the portable terminal unit 5 transmits an information list acquisition request to a document management unit 3A based on information acquired through the image analyzing operation, and the document management unit 3A transmits an information list based on the information list acquisition request to a multifunction unit 2A. The multifunction unit 2A displays a modification right holding user list screen 12 on a display part 54. In addition, a terminal unit 4 and a network 10 are configured in the same manner as the first embodiment.

In addition, a device identification image 101 based on a device ID which identifies the multifunction unit 2A is printed on, for example, a seal so as to be affixed to a housing of the multifunction unit 2A. In addition, a user identification image 100 based on a user ID is printed on an ID card. The device identification image 101 and the user identification image 100 are similar to a document identification image 110 and constitute machine-readable codes, so as to be read by the portable terminal unit 5.

(Portable Terminal Unit)

The portable terminal unit 5 is made up of a control part 50, which is realized by, for example, a CPU, for controlling respective parts of the portable terminal unit 5, a storage part 51, which is realized by, for example, a ROM, RAM or hard disk, for storing various types of programs and data, a wireless communication part 52 connected to the network 10, an input part 53 which is realized by, for example, alphabet keys or a cross key, a display part 54 which is realized by, for example, a liquid crystal display, an image sensing part 55 which is realized by a camera which optically captures an image of a machine-readable code or the like, and an image analyzing part 56 which performs an image analyzing operation on machine-readable codes sensed by the image sensing part 55 so as to acquire IDs contained in the respective machine-readable codes.

(Operation of Fourth Embodiment)

Figure 14:
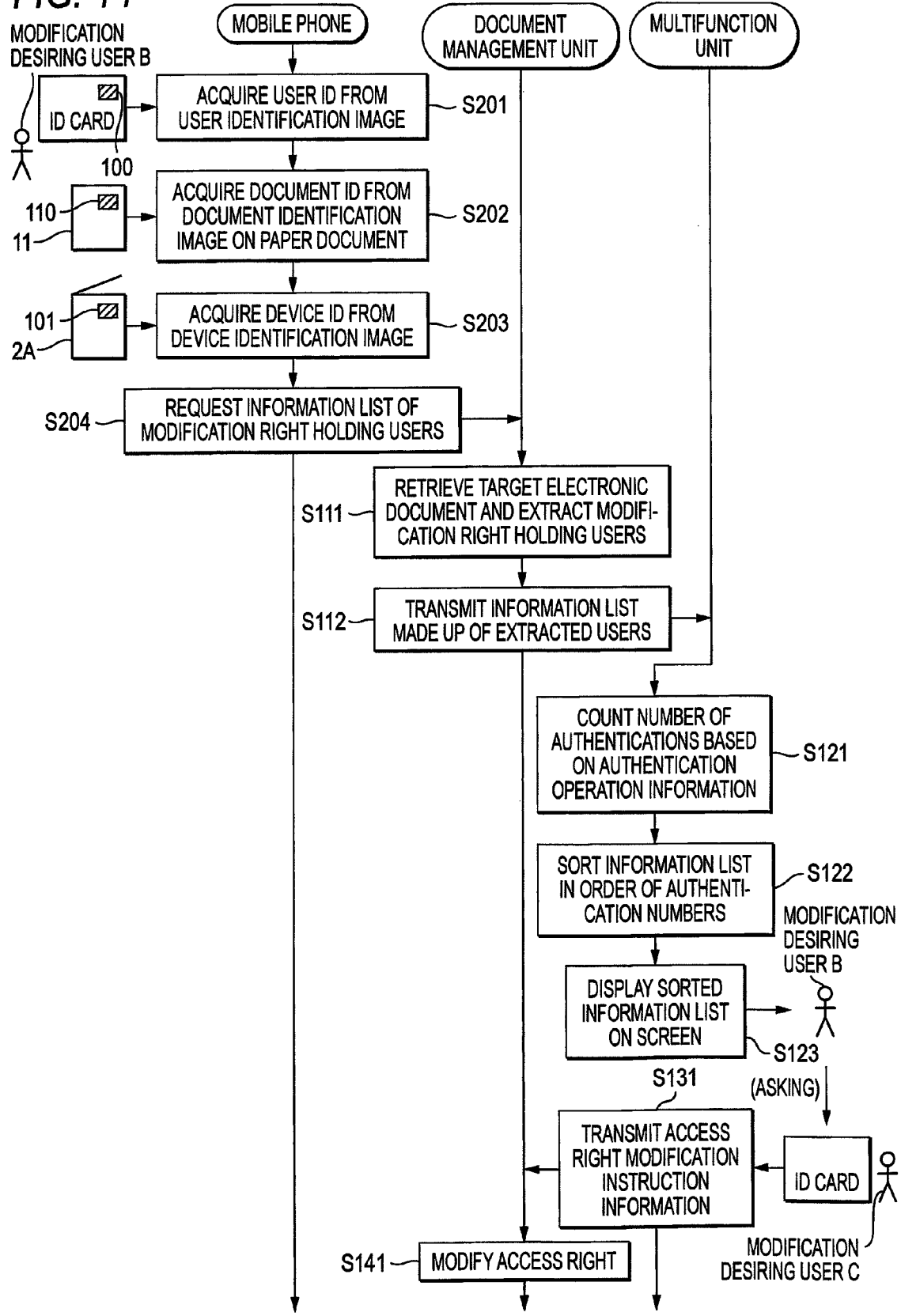
FIG. 14 is a timing chart showing an example of an access right modifying operation in the image processing system according to the fourth embodiment of the invention.

FIG. 14 is a timing chart showing an example of an access right modifying operation in the image processing system 1D. Here, it is understood that a modification desiring user B carries the portable terminal unit 5 and is operating the same unit on the periphery of the multifunction unit 2A. In addition, since a printing operation of a paper document is similar to that of the first embodiment, the description thereof will be omitted here.

(1) Sensing of Document Identification Image, Device Identification Image and User Identification Image When, using the portable terminal unit 5, the modification desiring user B performs an image sensing instructing operation by the input part 53 by aligning an image sensing position with the user identification image 100 on the ID card, the image sensing part 55 of the portable terminal unit 5 senses the user identification image 100. The image analyzing part 56 acquires a user ID from the user identification image 100 so sensed through an image analyzing operation (S201).

Similarly, the modification desiring user B senses the document identification image 110 and the device identification image 101 by the image sensing part 55, and the image analyzing part 56 acquires a document ID from the document identification image 110 (S202) and acquires a device ID from the device identification image 101 (S203). Note that the sensing order of the respective identification images is not limited to the order described above.

The control part 50 transmits an information list acquisition request which contains the acquired user ID, document ID and device ID to the document management unit 3A (S204).

(2) Display of Modification Right Holding Users on Screen

When receiving the information list acquisition request transmitted thereto, in the document management unit 3A, as with the first embodiment, modification right holding users are extracted by a modification right holding user extracting part 303 (S111) and transmits an information list made up of modification right holding user IDs so extracted to the multifunction unit 2A (S112).

Next, when receiving the information list transmitted thereto, in the multifunction unit 2A, as with the first embodiment, the number of authentications is counted by an authentication history management part 200 (S121), and the modification right holding user IDs are sorted by a sort and output part 202 in the order in which the authentication number or frequency increases (S122). Then, the sort and output part 202 displays a modification right holding user list screen 12 on an operation display part 23 (S123).

(3) Modification to Access Right

When the modification desiring user B visualizes the modification right holding user list screen 12 and asks a modification instructing user C to modify the access right, and the modification is authorized, as with the first embodiment, access right modification instruction information based on a modification instructing operation by the modification instructing user C is transmitted to the document management unit 3A (S131), and the access right is modified by the document management unit 3A (S141).

Fifth Embodiment

Figure 15:
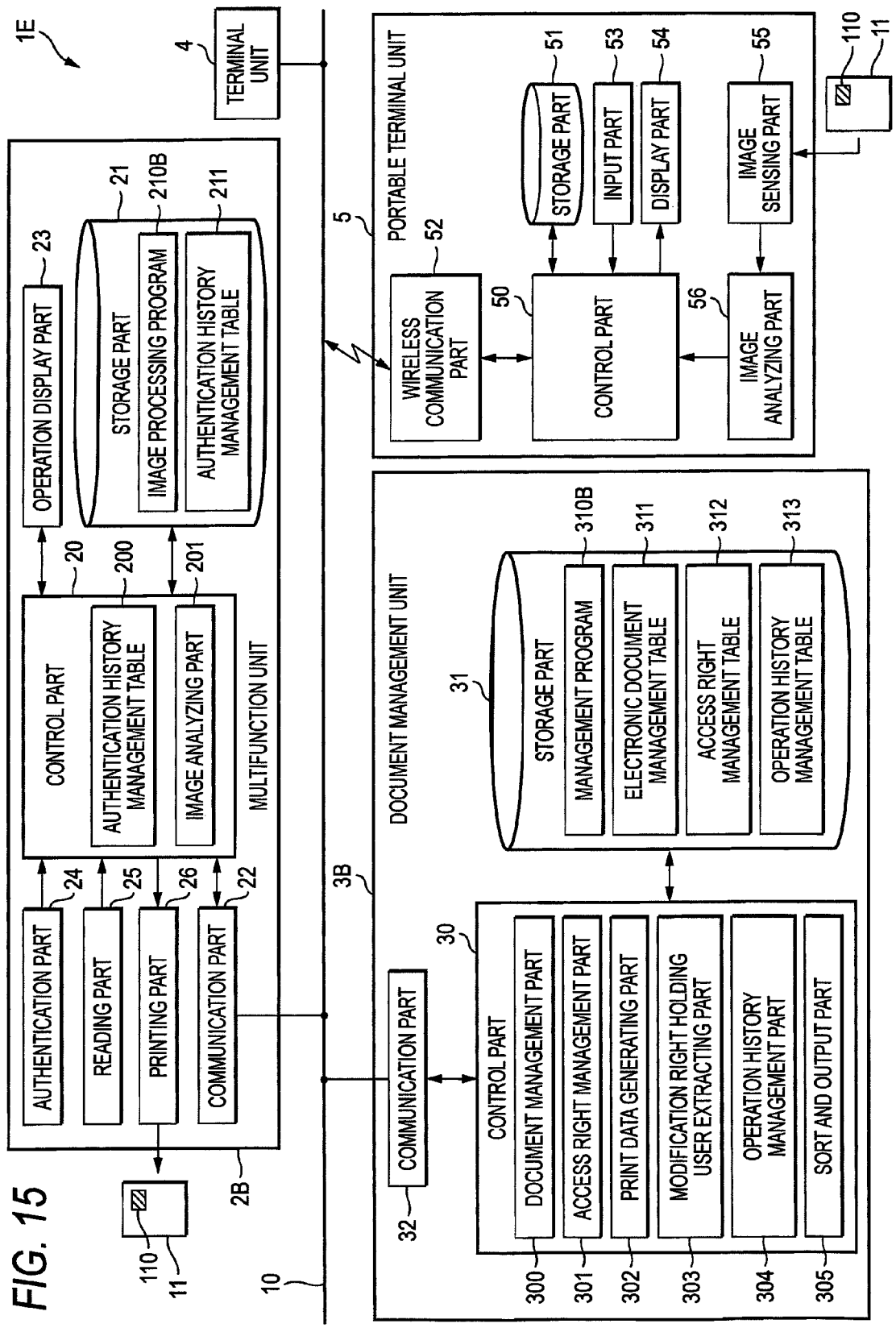
FIG. 15 is a block diagram showing an example of a schematic configuration of an image processing system according to a fifth embodiment of the invention.

FIG. 15 is a block diagram showing an example of a schematic configuration of an image processing system according to a fifth embodiment of the invention. In the image processing system 1D according to the fourth embodiment, the image processing system 1D includes the multifunction unit 2A which is configured in the same manner as the first embodiment, the modification right holding users are sorted in the order in which the authentication number or frequency increases by the sort and output part 202 of the multifunction unit 2A, and the modification right holding user list screen 12 is displayed on the multifunction unit 2A. In contrast to this, an image processing system 1E according to this embodiment includes a multifunction unit 2B and a document management unit 3B which are configured in the same manner as the second embodiment, and in the document management unit 3B, a sort and output part 305 sorts modification right holding users in the order in which the number or frequency of occurrence of authentication operations performed on the multifunction unit 2B increases, a portable terminal unit 5 displaying the modification right holding user list screen 12 on its display part. In addition, a terminal unit 4 and a network 10 are configured in the same manner as the first embodiment.

(Operation of Fifth Embodiment)

FIG. 16 is a timing chart showing an example of an access right modifying operation in the image processing system 1E. Here, as with the fourth embodiment, it is understood that a modification desiring user B carries the portable terminal unit 5 and is operating the same unit on the periphery of the multifunction unit 2B. In addition, since a printing operation of a paper document is similar to that of the first embodiment, the description thereof will be omitted here.

(1) Sensing of Document Identification Image, Device Identification Image and User Identification Image When the modification desiring user B performs an image sensing instructing operation to sense a user identification image 100, a document identification image 110 and a device identification image 101, the portable terminal 5 senses the respective images so as to acquire a user ID, a document ID and a device ID (S201 to 203) and transmits an information list acquisition request which contains the respective IDs so acquired (S204).

(2) Display of Modification Right Holding Users on Screen

When receiving the information list acquisition request transmitted thereto, in the modification desiring user B, as with the second embodiment, modification right holding users are extracted by a modification right holding user extracting part 303 (S111), and the number of operations performed on a multifunction unit specified by the device ID is counted by an operation history management part 304 (S113).

Next, the sort and output part 305 sorts modification right holding users contained in the information list in the order in which the operation number or frequency increases (S114), and a control part 30 transmits an information list in which the state is held where the modification right holding users are sorted in the order in which the operation number or frequency increases to the portable terminal unit 5 (S115).

When receiving the information list transmitted thereto, a control part 50 of the portable terminal unit 5 displays a modification right holding user list screen 12 on a display part 54 (S210).

(3) Modification to Access Right

When the modification desiring user B visualizes the modification right holding user list screen 12 and asks a modification instructing user C to modify the access right, and the modification is authorized, as with the first embodiment, access right modification instruction information based on a modification instructing operation by the modification instructing user C is transmitted to the document management unit 3B (S131), and the access right is modified by the document management unit 3B (S141)

Other Embodiments

Note that the invention is not limited to the embodiments that have been described heretofore but can be modified variously without departing from the spirit and scope of the invention. For example, while in the embodiments, the authentication history management part, the image analyzing part and the sort and output part of the multifunction unit and the document management part, the access right management part, print data generating part, the modification right holding user extracting part, the operation history management part, the sort and output part and the room-sharing user extracting part of the document management unit are realized by the control parts and the programs, part of the whole of the parts may be realized by hardware.

In addition, the programs used in the respective embodiments may be recorded on a recording medium such as a CD-ROM so as to be read into a storage part in the device from the recording medium. Alternatively, the programs may be downloaded on to the storage part in the device from a server connected to the network such as Internet.

Additionally, while in the embodiments, the document identification image is read from the paper document by the reading part of the multifunction unit or the image sensing part of the portable terminal unit, for example, the document identification image may be received by the multifunction unit via a facsimile communication part connected to the telephone line network. In addition, the information list may be transmitted as an electronic mail or may be transmitted as web page information which can be displayed by a web browser.

In addition, while in the embodiment, the multifunction unit includes the image analyzing part for analyzing the document identification image contained in the read image, the image analyzing part may be provided on the document management unit or may be provided on an image analyzing unit which is separated from the multifunction unit and the document management unit.

Additionally, the respective means possessed by the image processing system may be provided as part of the whole system, and hence, they may be provided on a single unit constituting the image processing system.

In addition, the constituent elements of the respective embodiments can be combined together without departing from the spirit and scope of the invention.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An image processing system comprising an authorized person information management apparatus and an image processing apparatus,
   the authorized person information management apparatus including:
      a first reception unit that receives information regarding a paper medium which contains data specifying information which specifies print source data of the paper medium;
      an authorized person information storage unit in which authorized person information, which denotes an authorized person having an authorization to process the print source data specified by the data specifying information contained in the information regarding the paper medium received by the first receiving unit, is stored while being associated with the print source data;
      an authorized person information acquisition unit that acquires the authorized person information from the authorized person information storage; and
      a first transmission unit that transmits the authorized person information acquired by the authorized person information acquisition unit;
   the image processing apparatus including:
      a reading unit that reads optically the paper medium which contains the data specifying information;
      a second transmission unit that transmits information regarding the paper medium which contains the data specifying information, and which is read by the reading unit to the authorized person information management unit;
      a second reception unit that receives the authorized person information transmitted by the first transmission unit; and
      an output unit that outputs the authorized person information received by the second reception unit.

2. The image processing system as claimed in claim 1, wherein
   the image processing unit includes:
      a utilization history information storage that stores utilization history information which contains user information which is generated in a case where a device of the image processing unit is used; and
      a sorting unit that sorts the authorized person information received by the second reception unit based on an occurrence timing or occurrence frequency of authorized person information which occurs in the user information contained in the utilization history information stored by the utilization history information storage, and
   the output unit outputs the authorized person information received by the second reception unit in the order in which the authorized person information was sorted by the sorting unit.

3. The image processing system as claimed in claim 1, wherein
   the image processing unit includes a display that displays information, and
   the output unit outputs the authorized person information received by the second reception unit to the display.

4. An image processing system comprising:
   a reading unit that optically paper medium containing data specifying information which specifies print source information of the paper medium;
   a reception unit that receives information regarding the paper medium which contains the data specifying information and which was read by the reading unit;
   an authorized person information acquisition unit that acquires authorized person information, which denotes an authorized person having an authorization to process the print source data specified by the data specifying information contained in the information regarding the paper medium received by the receiving unit, from authorized person information storage in which authorized person information is stored while being associated with the print source data;
   a user history information acquisition unit that acquires utilization history information which contains user information which is generated in a case where the reading unit is used; and
   a sorting unit that sorts the authorized person information acquired by the authorized person information acquisition unit based on an occurrence timing or occurrence frequency of authorized person information which occurs in the user information contained in the user history information acquired by the authorized person information acquisition unit,
   wherein
   the output unit outputs the authorized person information acquired by the authorized person information acquisition unit in the order in which the authorized person information was sorted by the sorting unit.

5. An image forming apparatus comprising:
   a reading unit that reads optically a paper medium containing data specifying information which specifies print source data of the paper medium;
   a transmission unit that transmits information regarding the paper medium which contains the data specifying information, and which is received by the receiving unit;
   a reception unit that receives authorized person information denoting an authorized person having an authorization to process the print source data specified by the data specifying information;
   a user history information acquiring unit that acquires utilization history information which contains user information which is generated in a case where the reading unit is used; and
   an output unit that outputs the authorized person information received by the reception unit so as to specify a user as the authorized person whose timing of the authorized person information occurring in the user information contained the utilization history information is most recent or whose frequency of the authorized person information occurring in the user information contained the utilization history information is largest.

6. The image processing apparatus as claimed in claim 5, wherein the reception unit receives the authorized person information denoting the authorized person who is authorized to modify the authorized person information for the print source data specified by the data specifying information.

7. The image processing apparatus as claimed in claim 5, wherein the reception unit receives the authorized person information denoting the authorized person who is authorized to modify the contents of the print source data specified by the data specifying information.

8. The image processing apparatus as claimed in claim 5, further comprising:

a display unit that displays information,
wherein
the output unit outputs the authorized person information received by the reception unit to the display.

9. An authorized person information management apparatus comprising:

a reception unit that receives information regarding a paper medium which contains data specifying information which specifies print source data of the paper medium;

an authorized person information acquisition unit that acquires authorized person information, which denotes an authorized person having an authorization to process the print source data specified by the data specifying information received by the reception unit, from authorized person information storage in which authorized person information is stored while being associated with the print source data;

a user history information acquisition unit that acquires utilization history information which contains user information which is generated in a case where the reading unit is used; and a sorting unit that sorts the authorized person information acquired by the authorized person information acquisition unit based on an occurrence timing or occurrence frequency of authorized person information which occurs in the user information contained in the user history information acquired by the authorized person information acquisition unit, wherein the output unit outputs the authorized person information acquired by the authorized person information acquisition unit in the order in which the authorized person information was sorted by the sorting unit.

\* \* \* \* \*